United States Patent
Snyder et al.

(10) Patent No.: US 7,805,581 B2
(45) Date of Patent: Sep. 28, 2010

(54) MULTIPLE ADDRESS AND ARITHMETIC BIT-MODE DATA PROCESSING DEVICE AND METHODS THEREOF

(75) Inventors: Michael D. Snyder, Austin, TX (US); David C. Holloway, Cedar Park, TX (US); Trinh H. Nguyen, Round Rock, TX (US); Sergio Schuler, Austin, TX (US); Gary L. Whisenhunt, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 622 days.

(21) Appl. No.: 11/679,590

(22) Filed: Feb. 27, 2007

(65) Prior Publication Data

US 2008/0209182 A1    Aug. 28, 2008

(51) Int. Cl.
*G06F 12/00* (2006.01)
(52) U.S. Cl. ............... 711/154; 711/170; 711/E12.084
(58) Field of Classification Search ................. 712/221; 711/220

See application file for complete search history.

(56) References Cited

U.S. PATENT DOCUMENTS 7,010,665 B1 * 3/2006 Toll et al. ..................... 711/220
7,124,279 B2 * 10/2006 Topham ....................... 712/24
2002/0042862 A1 * 4/2002 Breternitz et al. ........... 711/125

* cited by examiner

*Primary Examiner*—Mardochee Chery

(57) ABSTRACT

A data processing device and methods thereof are disclosed. The data processing device can operate in three different modes. In a first, N-bit mode, the data processing device performs memory accesses based on N-bit values and performs arithmetic operations using N-bit values. In a second, hybrid N-bit/M-bit mode, the data processing device performs memory accesses based on M-bit values, where M is less than N, and performs arithmetic operations using N-bit values. In a third, M-bit mode, the data processing device performs memory accesses based on M-bit values and performs arithmetic operations using M-bit values. The three modes provide for compatibility with a wide range of applications. Further operation in the M-bit mode can provide a power savings when implementing applications compatible with that mode.

20 Claims, 3 Drawing Sheets

MULTIPLE ADDRESS AND ARITHMETIC BIT-MODE DATA PROCESSING DEVICE AND METHODS THEREOF

FIELD OF THE DISCLOSURE

The present disclosure relates to data processors and more particularly to operating modes of data processors.

BACKGROUND

Data processors are employed in electronic devices to execute tasks set forth in a set of program instructions. As the tasks become more complex or demand more precision, it is sometimes desirable to increase the bit-width of the data processor. For example, a 32 bit processor can typically execute tasks of greater complexity and greater precision than an 8 or 16 bit processor. Further, it is sometimes desirable for a data processor to execute programs designed for a processor having a lower bit-width, to provide backward compatibility for those programs. However, the manner in which backward compatible modes are defined can vary. For example, for a 64 bit processor, the 32 bit compatibility mode is sometimes defined so that 64 bit results and instructions are provided by and available to the 32 bit application. In other compatibility definitions, the 32 bit compatible mode only provides 32 bit results to the application. Although software can be designed to comply with multiple compatibility definitions, this can increase the software complexity and decrease its efficiency. Accordingly, there is a need for an improved data processor and methods thereof.

DETAILED DESCRIPTION

A data processing device and methods thereof are disclosed. The data processing device can operate in three different modes. In a first, N-bit mode, the data processing device performs memory accesses based on N-bit values and performs arithmetic operations using N-bit values. In a second, hybrid N-bit/M-bit mode, the data processing device performs memory accesses based on M-bit values, where M is less than N, and performs arithmetic operations using N-bit values. In a third, M-bit mode, the data processing device performs memory accesses based on M-bit values and performs arithmetic operations using M-bit values. The three modes provide for compatibility with a wide range of applications. Further operation in the M-bit mode can provide a power savings when implementing applications compatible with that mode.

Figure 1:
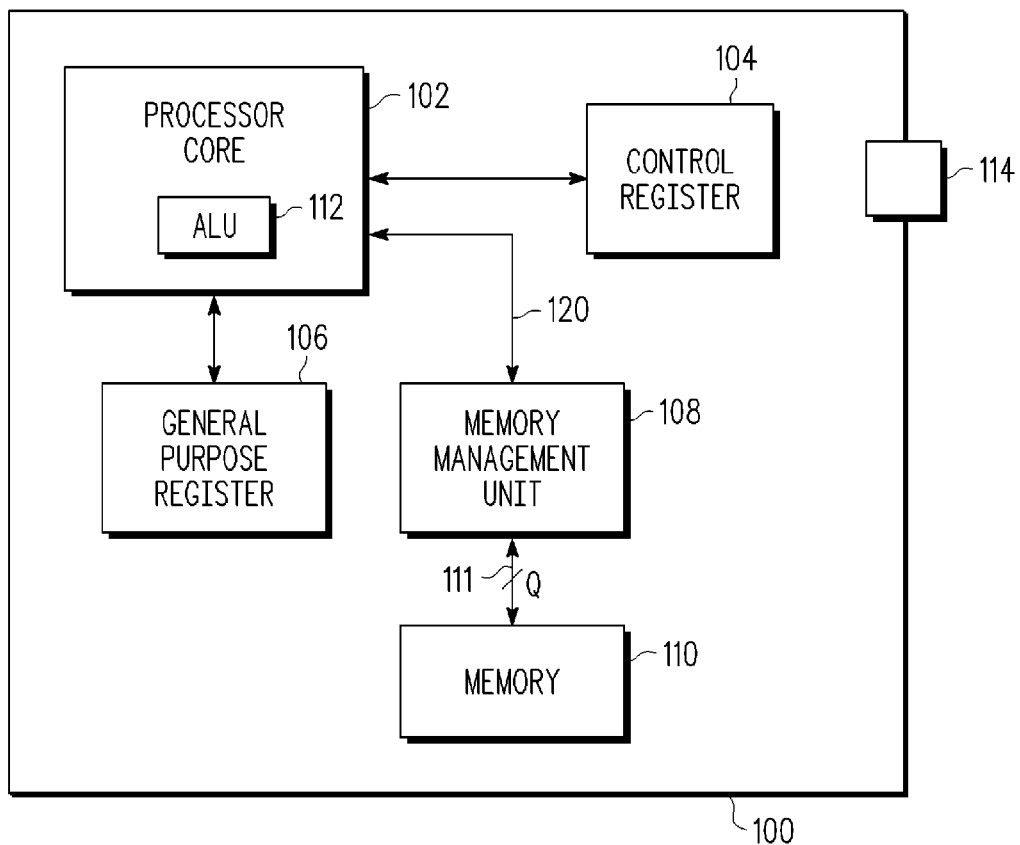
FIG. 1 is a block diagram of a particular embodiment of a data processing device.

Referring to FIG. 1, a block diagram of a particular embodiment of a data processing device 100 is illustrated. The data processing device 100 includes a processor core 102, a control register 104, a general purpose register 106, a memory management unit 108, a memory 110 and an input/output pin 114. The processor core 102 includes connections to the control register 104 and the general purpose register 106. Further the processor core 102 is connected to the memory management unit 108 via a bus 120. The memory management unit 108 is connected to the memory 110 via a Q-bit bus 111. In addition, the processor core 102 includes an arithmetic logic unit (ALU) 112.

The processor core 102 executes instructions provided by software applications or routines. The processor core 102 is configured so that it can execute software applications or routines designed to operate with an N-bit processor and software programs designed to operate with an M-bit processor. The processor core 102 accesses the ALU 112 to perform arithmetic functions based on instructions provided by the software applications or routines.

The control register 104 includes control information for the processor 102. In a particular embodiment, the control register 104 includes control information to indicate whether the data processing device 100 should operate in an N-bit mode, an M-bit mode, or a hybrid N-bit/M-bit mode.

The general purpose register 106 is a register that can perform different functions for the data processing device 100, include storing arithmetic operands, arithmetic results, memory address, data returned from memory, and the like. In a particular embodiment, the general purpose register is a register file.

The memory management unit 108 receives read and write requests for the memory 110, and performs memory management functions, including translation of received logical address to physical addresses. The memory management unit 108 may also be coupled to an external bus (not shown) to access data external to the data processing device 100. The memory 110 stores information for the data processing device 100 and may be a random access memory (RAM), non-volatile memory such as flash memory, and the like.

During operation, the processor core 102 executes instructions represented by software programs or routines. To execute the instructions, the processor core 102 can access the memory 110 via the memory management unit 108. For example, to read a memory location, the processor core 102 provides a memory address to the memory management unit 108 via the bus 120. The memory address may be determined based on one or more entries contained in the general purpose register file 106. The memory management unit 108 accesses the memory location of the memory 110 identified by the memory address via the bus 111, and provides the data to the processor core 102 which formats and writes the data to general purpose register file 106. The processor core 102 can perform write operations in a similar manner, by identifying the address where data should be written using the general purpose register 106.

In addition, the processor core 102 can employ the ALU 112 to execute the program instructions. The processor core 102 supplies one or more arithmetic operands to the ALU 112, as well as an indication of the arithmetic operation to be performed, such as addition, subtraction, or multiplication. The operands may be provided to the ALU 112 via the general purpose register 106. The ALU 112 performs the identified operation and provides the result to the processor core 102, which may use the result to execute subsequent instructions, store the result in the memory 110, write the result to general purpose register file 106, or take other appropriate actions.

Figure 2:
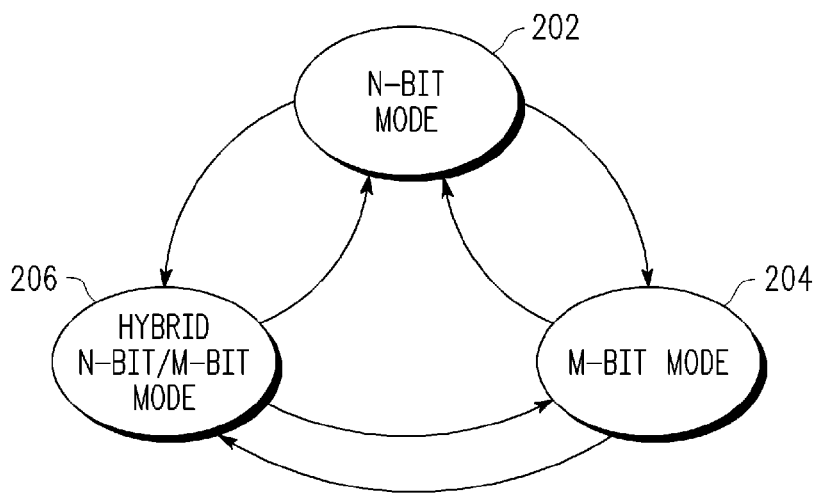
FIG. 2 is a state diagram of a particular embodiment of three operating modes associated with the data processing device of FIG. 1

The data processing device 100 operates in different modes. These modes may be better understood with reference to FIG. 2. FIG. 2 illustrates three operating modes for the data processing device 100, including an N-bit mode 202, an M-bit mode 204, and a hybrid N-bit/M-bit mode 206, where M is less than N. In a particular embodiment, M is equivalent to N divided by $2^P$, where P is an integer. For example, in one particular embodiment, M is 32 and N is 64 (P=1). In another particular embodiment, M is 64 and N is 128.

In the N-bit mode 202, the data processing device 100 can execute programs designed to implement an N-bit instruction set. Accordingly, the processor core 102 accesses the memory 110 using N-bit addresses. The processor core 102 reads and writes N-bit data values to and from the general purpose register 106, and the memory management unit uses the N-bit address to access the memory 110. The size Q of the bus 111 between the memory management unit 108 and the memory 110 is independent of the values of M and N. Accordingly, the memory management unit 108 translates the N-bit address in the general purpose register to a Q-bit address in order to access the memory 110. In a particular embodiment, Q is equal to N.

In addition, in the N-bit mode 202 the processor core 102 performs arithmetic operations using N-bit values. Thus, the processor core 102 provides N-bit operands to the ALU 112, which returns an N-bit result.

In the M-bit mode 204, the processor core 102 accesses the memory 110 using M-bit addresses. Accordingly, the processor core 102 reads and writes M-bit data values to the general purpose register 106, and the memory management unit 108 uses an M-bit address to access the memory 110 via the bus 111. As explained, the memory management unit 108 can translate the M-bit address to a Q-bit address for the bus 111, so that the memory 110 is addressed with the same addressing scheme in the N-bit mode 202, the hybrid N-bit/M-bit mode 206, and the M-bit mode 204. In addition, in the M-bit mode 204 the processor core 102 performs arithmetic operations using M-bit values. Thus, the processor core 102 provides M-bit operands to the ALU 112, which returns an M-bit result.

In the M-bit mode 204, the data processing device 100 may use less power relative to the N-bit mode 202. For example, in the M-bit mode the ALU 112 uses less circuitry to implement the arithmetic operations, allowing power to be reduced to the portion of the ALU 112 used to implement N-bit operations, thereby reducing the power consumption of the data processing device 100. Further, in the M-bit mode 204, the processor 102 can execute software programs or routines designed to be compatible with the M-bit mode.

In the hybrid N-bit/M-bit mode 206, the processor core 102 accesses the memory 110 using M-bit addresses. Accordingly, the processor core 102 reads and writes N-bit data values to and from the general purpose register 106, and the memory management unit 108 uses the M-bit address to access the memory 110. The memory management unit 108 can translate the M-bit address to an Q-bit address, so that the memory 110 is addressed with the same addressing scheme in the N-bit mode 202, the hybrid N-bit/M-bit mode 206, and the M-bit mode 204. For example, in the hybrid N-bit/M-bit mode 206 and in the M-bit mode 204 the memory management unit 108 can add a leading or trailing value, such as series of zeroes or ones, to the M-bit address to create a Q-bit address, and use the created address to access the memory 110. In addition, in the N-bit mode 202 and the hybrid N-bit/M-bit mode 206 the processor core 102 performs arithmetic operations using N-bit values. Thus, the processor core 102 provides N-bit operands to the ALU 112, which returns an N-bit result.

In the hybrid N-bit/M-bit mode 206, the data processing device 100 is compatible with other software programs or routines. For example, a program may have been developed for an N-bit device, but designed to execute as an M-bit program. This may occur, for example, when a program originally designed for an M-bit device is updated to operate on an N-bit device. The hybrid N-bit/M-bit mode 206 allows the data processing device 100 to execute such a program.

As illustrated in FIG. 2, the data processing device 100 can change modes of operation. The operating mode of the data processing device 100 can be set in a number of ways. For example, the operating mode may be set by one or more control bits of the control register 104. The control bits can be set by the software program or routine being executed by the processor core 102, so that the data processing device 100 can change modes depending on the software program or routine being executed. In another particular embodiment, the mode of operation can be set by the input/output pin 114 of the data processing device 100.

Figure 3:
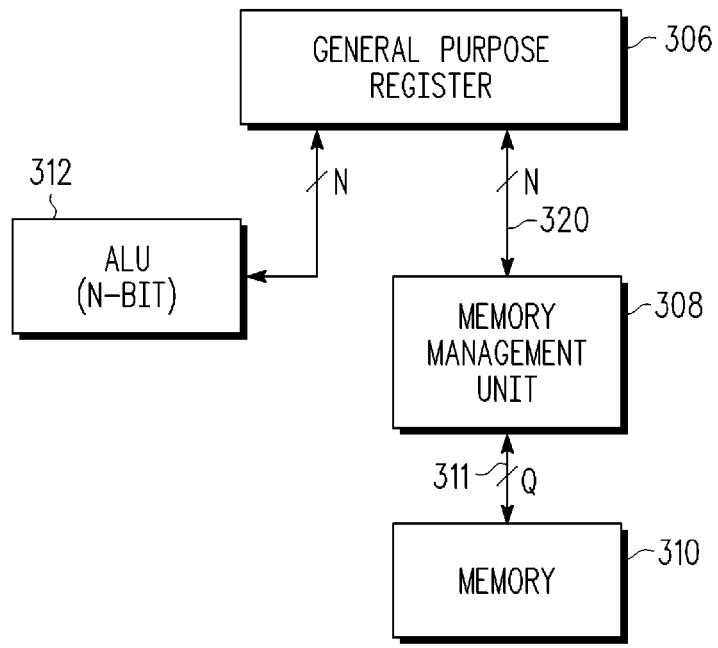
FIG. 3 is a block diagram of a particular embodiment of an M-bit operating mode of the data processing device of FIG. 1.

Referring to FIG. 3, a block diagram of a particular embodiment of an N-bit operating mode for the data processing device 300, corresponding to the data processing device 100 of FIG. 1, is illustrated. As illustrated, in the N-bit mode of operation, a general purpose register 306 provides via an N-bit wide interface, such as an N-bit bus, operands to an N-bit arithmetic logic unit (ALU) 312. In addition, the general purpose register 306 provides memory addresses via an N-bit bus with a memory management unit 308. The memory management unit 308 communicates with a memory 310 via a bus 311.

During operation, in the N-bit mode, N-bit arithmetic operands are provided to the general purpose register 306 from a processor core or other appropriate module. The N-bit operands are provided via an N-bit bus to the ALU 312, which performs an arithmetic operation and returns the N-bit result to the general purpose register 306, where it can be accessed by a processor core or other module of the data processing device 300.

In addition, N-bit data values are provided to the general purpose register 306 by a processor core or other module. The memory management unit 308 accesses the N-bit value and uses it as an address to perform read and write operations on the memory 310. The memory management unit 308 can, for example, translate an N-bit logical address stored in the general purpose register 306 to a physical address, and provide the physical address to the memory 310 via the bus 311 to execute a read or write operation. Accordingly, in the N-bit mode, the data processing device 300 performs memory accesses based on N-bit logical address values, and performs arithmetic operations using N-bit values.

Figure 4:
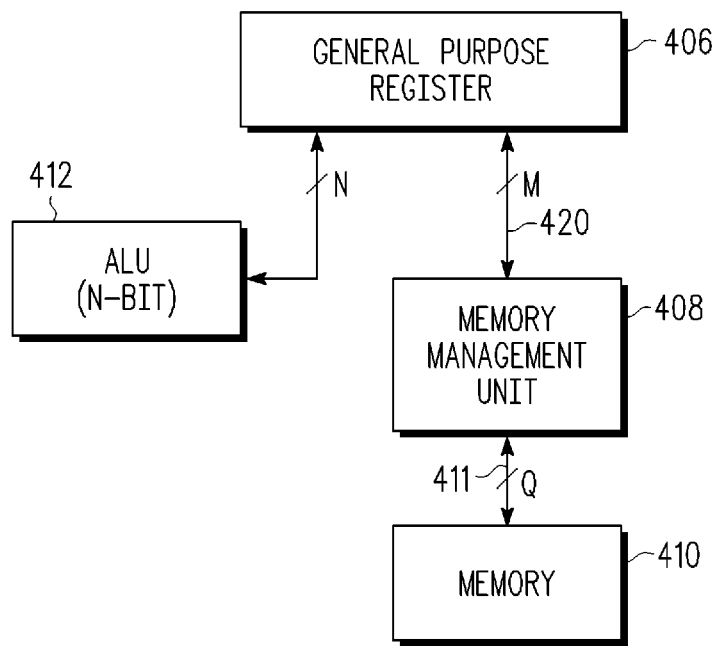
FIG. 4 is a block diagram of a particular embodiment of a hybrid M-bit/N-bit operating mode of the data processing device of FIG. 1.

Referring to FIG. 4, a block diagram of a particular embodiment of an N-bit/M-bit hybrid operating mode for the data processing device 400, corresponding to the data processing device 100 of FIG. 1, is illustrated. As illustrated, in the N-bit mode of operation, a general purpose register 406 provides operands via an N-bit wide bus to an N-bit arithmetic logic unit (ALU) 412. In addition, the general purpose register 406 provides addresses via an M-bit bus to a memory management unit 408. The M-bit bus may be M lines of an N-bit bus, so that the same N-bit bus used in the N-bit mode described with respect to FIG. 2 is used as the M-bit bus in the hybrid mode. The memory management unit 408 communicates with a memory 410 via a bus 411.

During operation, in the N-bit/M-bit hybrid mode, N-bit arithmetic operands are provided to the general purpose register 406 from a processor core or other appropriate module. The N-bit operands are provided via an N-bit bus to the ALU 412, which performs an arithmetic operation and returns the result to the general purpose register 406, where it can be accessed by a processor core or other module of the data processing device 400.

In addition, M-bit memory addresses are provided to the general purpose register 406 by a processor core or other module. The memory management unit 408 accesses the M-bit address to perform read and write operations on the memory 410. The memory management unit 408 can translate the M-bit logical address stored in the general purpose register 406 to a physical address, and provide the physical address to the memory 410 to execute a read or write operation. For example, the memory management unit can add Q-M leading zeroes or ones to the M-bit address to create an Q-bit address, and provide the Q-bit physical address at the bus 411. Accordingly, in the N-bit mode/M-bit hybrid mode, the data processing device 400 performs memory accesses based on M-bit logical address values, and performs arithmetic operations using N-bit values.

Figure 5:
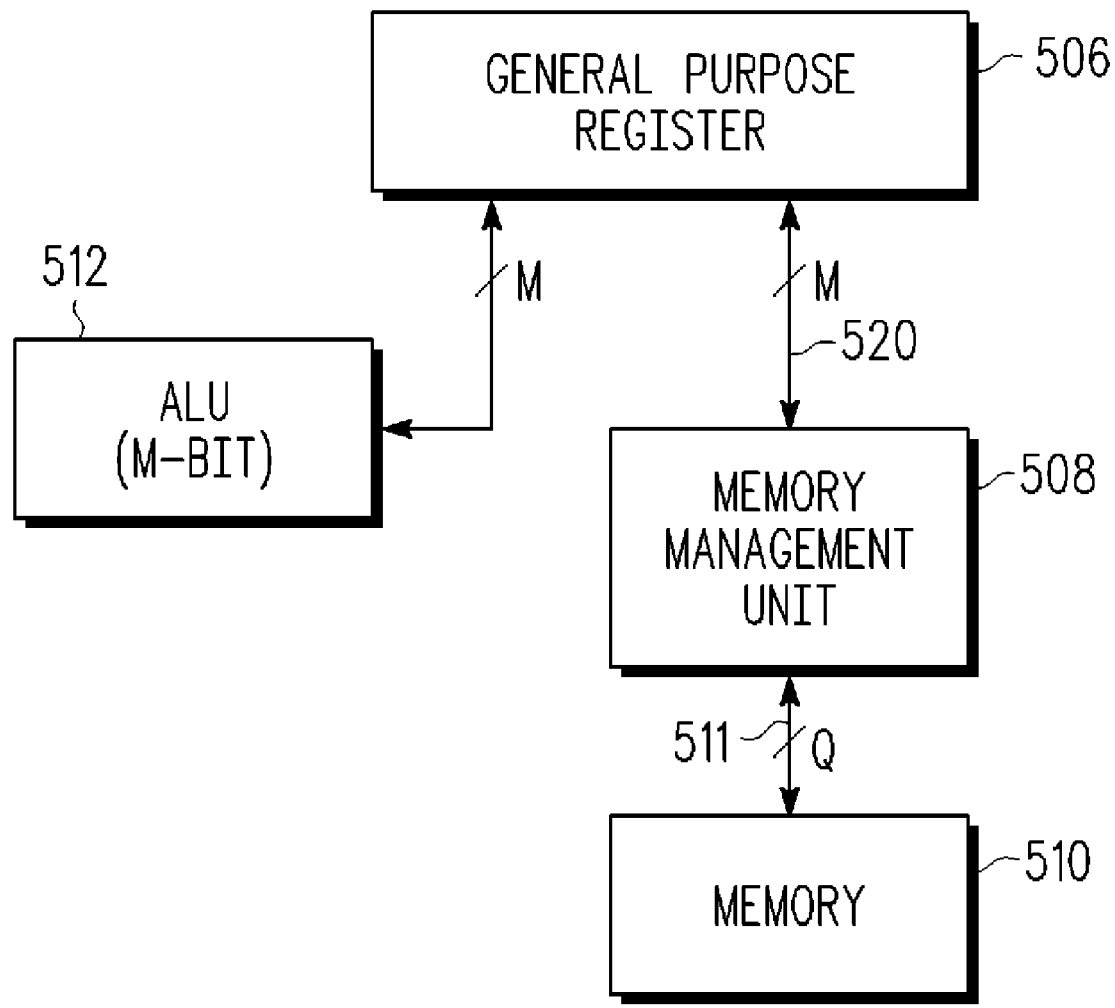
FIG. 5 is a block diagram of a particular embodiment of an N-bit operating mode of the data processing device of FIG. 1.

Referring to FIG. 5, a block diagram of a particular embodiment of an M-bit operating mode for the data processing device 500, corresponding to the data processing device 100 of FIG. 1, is illustrated. As illustrated, in the M-bit mode of operation, a general purpose register 506 provides operands via an M-bit wide bus to an N-bit arithmetic logic unit 512. In addition, the general purpose register provides addresses via an M-bit bus to a memory management unit 508. The M-bit buses illustrated in FIG. 5 may each be M lines of an N-bit bus, so that the same N-bit buses used in the N-bit mode described with respect to FIG. 3 are used as the M-bit buses in the hybrid mode. The memory management unit 508 communicates with a memory 510 via a bus 511.

During operation, in the M-bit mode, M-bit arithmetic operands are provided to the general purpose register 506 from a processor core or other appropriate module. The M-bit operands are provided via an M-bit bus to the ALU 512, which performs an arithmetic operation and returns the M-bit result to the general purpose register 506, where it can be accessed by a processor core or other module of the data processing device 500.

In addition, M-bit memory addresses are provided to the general purpose register 506 by a processor core or other module. The memory management unit 508 accesses the M-bit value and uses it as an address to perform read and write operations on the memory 510. The memory management unit 508 can translate the M-bit logical address stored in the general purpose register 506 to a Q-bit physical address, and provide the physical address to the memory 510 via the bus 511 to execute a read or write operation. For example, the memory management unit can add Q-M leading zeroes or ones to the M-bit address to create a Q-bit physical address, and provide the physical address to the memory 510. Accordingly, in the M-bit mode, the data processing device 500 performs memory accesses based on M-bit address values, and performs arithmetic operations using M-bit values.

As illustrated, the M-bit mode uses smaller buses or fewer bus lines of the same bus, than the N-bit mode, and also performs M-bit arithmetic operations in the ALU 512. This can result in a power savings relative to the N-bit and the N-bit/M-bit hybrid modes. Accordingly, the M-bit mode can be associated with a low-power mode of the data processing device 500.

Other embodiments, uses, and advantages of the disclosure will be apparent to those skilled in the art from consideration of the specification and practice of the disclosure disclosed herein. For example, although logical memory addresses have been discussed as being determined based on contents of a general purpose register, such logical memory addresses may be formed in other ways. For example, addresses may be determined based on instruction fields for instructions executed at a processor core, a combination of an instruction field and contents of a general purpose register, and the like. Further, although an MMU has been disclosed as translating logical address to physical addresses, it will be appreciated that other modules, such as a processor core, could translate the addresses. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method of operating a processing device comprising:
in response to determining mode information indicates a first mode of operation, performing memory accesses at the processing device by translating N-bit address values stored at a first register to corresponding physical addresses associated with a memory device and performing arithmetic operations at the processing device using N-bit values;
in response to determining the mode information indicates a second mode of operation, performing memory accesses at the processing device by translating M-bit address values stored at the first register to corresponding physical addresses associated with the memory device and performing arithmetic operations at the processing device using N-bit values, wherein M is less than N; and
in response to determining the mode information indicates a third mode of operation, performing memory accesses at the processing device by translating M-bit address values stored at the first register to corresponding physical addresses associated with the memory device and performing arithmetic operations at the processing device using M-bit values.

2. The method of claim 1, wherein translating M-bit address values in the third mode of operation comprises translating the M-bit address values of M-bits to address values of Q-bits, where Q is different from M.

3. The method of claim 1, wherein translating M-bit address values in the second mode of operation comprises translating the M-bit address values to address values of Q-bits, where Q is different from M.

4. The method of claim 1, further comprising determining a mode of operation of the processing device based on the mode information.

5. The method of claim 4, wherein the mode information is based on one or more bits of a register.

6. The method of claim 4, wherein
the mode information is based on one or more input pins.

7. The method of claim 1, wherein N is 64 and M is 32.

8. The method of claim 1, wherein N is 128 and M is 64.

9. A device, comprising:
an N-bit storage location;
a memory device;
an arithmetic logic module coupled to the N-bit storage location, the arithmetic logic module configured to:
in a first mode of operation perform arithmetic operations using N-bit values from the N-bit storage location;

in a second mode of operation perform arithmetic operations using N-bit values from the N-bit storage location;

in a third mode of operation perform arithmetic operations using M-bit values from the N-bit storage location, wherein M is less than N;

a memory management module coupled to the N-bit storage location, the memory management module configured to:

in the first mode of operation perform memory accesses by translating N-bit address values from the N-bit storage location to corresponding physical addresses associated with the memory device;

in the second mode of operation perform memory accesses by translating M-bit address values from the N-bit storage location to corresponding physical addresses associated with the memory device;

in the third mode of operation perform memory accesses by translating M-bit address values from the N-bit storage location to corresponding physical addresses associated with the memory device.

10. The device of claim 9, wherein the N-bit storage location is a register file.

11. The device of claim 9, wherein the corresponding physical address values are Q-bit address values in the third mode of operation, where Q is different from M.

12. The device of claim 9, wherein the corresponding physical address values are Q-bit address values in the second mode of operation, where Q is different from M.

13. The device of claim 9, wherein M is equal to N divided by $2^P$, where P is an integer.

14. The device of claim 9, wherein M is 32 and N is 64.

15. The device of claim 9, wherein M is 64 and N is 128.

16. The device of claim 9, wherein the mode of operation of the arithmetic logic module is based on one or more bit values of a register.

17. The device of claim 9, wherein the mode of operation of the arithmetic logic module is based on an input/output pin of the device.

18. The device of claim 9, further comprising a memory coupled to the memory management module.

19. The device of claim 9, further comprising a bus coupled between the N-bit storage location and the memory management module, and wherein in the first mode of operation the N-bit address values are provided via the bus and in the second mode of operation the M-bit address values are provided via the bus.

20. The device of claim 19, wherein in the third mode of operation the M-bit address values are provided via the bus.

* * * * *